United States Patent
Cadoux

(10) Patent No.: US 7,346,568 B1
(45) Date of Patent: Mar. 18, 2008

(54) SERIALLY STAGED, INITIAL PUBLIC STOCK OFFERING METHOD

(76) Inventor: Robert Cadoux, 18 Fairmont Ave., Hastings-On-Hudson, NY (US) 10706

( * ) Notice: Subject to any disclaimer, the term of this patent is extended or adjusted under 35 U.S.C. 154(b) by 566 days.

(21) Appl. No.: 09/491,388

(22) Filed: Jan. 26, 2000

(51) Int. Cl.
*G06Q 40/00* (2006.01)

(52) U.S. Cl. ................................ 705/36 R; 705/35

(58) Field of Classification Search .................. 705/35, 705/36, 37
See application file for complete search history.

(56) References Cited

U.S. PATENT DOCUMENTS

| | | | | |
|---|---|---|---|---|
| 4,412,287 A * | 10/1983 | Braddock, III | ............... | 705/37 |
| 5,835,896 A | 11/1998 | Fisher et al. | | |
| 5,940,810 A * | 8/1999 | Traub et al. | .................. | 705/36 |
| 5,950,176 A | 9/1999 | Keiser et al. | | |
| 5,974,403 A * | 10/1999 | Takriti et al. | ............... | 702/180 |
| 6,035,286 A * | 3/2000 | Fried | ........................... | 705/36 |
| 6,058,377 A * | 5/2000 | Traub et al. | .................. | 705/35 |
| 6,058,379 A * | 5/2000 | Odom et al. | .................. | 705/37 |
| 6,243,691 B1 | 6/2001 | Fisher et al. | | |
| 6,269,343 B1 | 7/2001 | Pallakoff | | |
| 6,282,521 B1 * | 8/2001 | Howorka | ..................... | 705/35 |
| 6,285,989 B1 | 9/2001 | Shoham | | |
| 6,317,727 B1 | 11/2001 | May | | |
| 6,629,082 B1 * | 9/2003 | Hambrecht et al. | ........... | 705/37 |

OTHER PUBLICATIONS

"Conditional price trends in the aftermarket for initial public offerings", Affleck-Graves et al, Financial Management v25n4, pp. 25-40 Winter 1996.*

"The opening price performance of initial public offerings of common stock", Barry et al., Fincncial Management, v22, n1, p. 54 spring 1993.*

"Handbook of Modern Finance", 1995 Edition, Dennis E. Logue.*

"The NASDAQ Handbook", The National Association of Securities Dealers, Inc. 1992, Probus Publishing Company, Chicago, Illinois.*

"Going Public and the Nasdaq Market"-Chapter 7-The NASDAQ Handbook-1992 Edition, by Gordon S. Macklin, Abby M. Adlerman, and Kenneth Hao.*

(David C. Mauer et al.), "The Effect of the Secondary Market on the Pricing of the Initial Public Offerings: Theory and Evidence", Journal of Financial and Quantitative Analysis (vol. 27, No. 1, Mar. 1992).*

(Gary D. Bruton et al.), Strategy and IPO Market Selection: Implications for the Entrepreneurial Firm Journal of Small Business Management (Oct. 1997 pp. 1-10).*

(Chester Spatt et al.), "Preplay Communication,Participation Restrictions, and Efficiency in Initial Pblic Offerings", The Review of Financial Studies, (Winter 1991).*

(Continued)

*Primary Examiner*—James A. Kramer
*Assistant Examiner*—Elda Milef
(74) *Attorney, Agent, or Firm*—Kirkpatrick & Lockhart Preston Gates Ellis LLP

(57) ABSTRACT

A method for offering stock. The method includes offering a first portion of shares of the stock at a first price and offering a second portion of the shares at a second price after a first trading interval of a first predetermined time period after the offering of the first portion of the shares.

13 Claims, 3 Drawing Sheets

OTHER PUBLICATIONS

Carey, Theresa W., "The Electronic Investor:IPO Dot.com? Not Yet." Barron's, Jan. 10, 2000, vol. 80, Iss. 2, p. 40.*

Perkins, Anthony b. "IPOs Go Dutch, and Small Investors Gain." Asian Wall Street Journal, New York, NY: Dec. 31, 1999, p. 8. ☐☐☐☐☐.*

Seglin, Jeffrey L. "Take This company Public.", Inc. Jan. 2000, vol. 22, Iss. 1; p. 99, 1 pgs.*

Elder, Laura. "Point, Click, Buy." Houston Business Journal. Dec. 17, 1999. vol. 30, Iss. 30; p. 16.*

Smith, Lisa F., "Investors Face Rewards, Risks with Initial Public Offerings," *Herald-Sun*, Durham, NC, Jun. 20, 1999.

Lyric Energy, Inc., Form 8K, Securities and Exchange Commission, Apr. 10, 1997 (www.secinfo.com/duHbs.829.htm).

* cited by examiner

SERIALLY STAGED, INITIAL PUBLIC STOCK OFFERING METHOD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention relates generally to methods for publicly offering stock.

2. Description of the Background

Privately-held companies typically launch a public stock offering, often called an "initial public offering", or an "IPO", to raise needed capital to expand their businesses. Traditionally, the company mounting the IPO sets an initial price (the "IPO price") at which the stock will be offered to the public. The IPO price is typically established by an investment banker based on a number of factors, including how much capital the company needs to raise, public reception to the stock from institutional clients, such as mutual funds, brokerages, and money managers, the value of stock of similar companies already trading on the open market, and the IPO price of comparable companies that have launched recent IPOs.

Once the IPO price is established, the shares are traditionally subscribed to by underwriters, who buy shares of the stock from the company mounting the IPO at a discounted price such as, for example, seven percent off the IPO price. The capital raised by the offering company is determined by the amount of shares sold to each of the subscribing underwriters at the IPO price. The underwriters then typically sell those shares at the IPO price to large individual and institutional investors, including brokerages. It is those institutions which then initiate the public trading of the stock by selling the shares to investors in the open market.

Typically, the price at which the shares trade on the open market after the initial offering greatly exceeds the IPO price. The offering company, however, does not realize the additional capital associated with the enhanced share price of its stock. Rather, the capital raised by the offering company is limited to the number of shares offered at the IPO price (less the underwriter discount) during the subscription stage of the offering. The difference between the aggregate value of the shares after the IPO and the capital raised by the offering company is commonly referred to as "money left on the table", because it represents additional money the company could have raised if the IPO price had better reflected the market demand for the stock.

In some instances, such as with some recent Internet IPOs, the amount of money left on the table, and hence unavailable to the treasury of the offering company, can be staggering. For example, on Dec. 10, 1999, FreeMarkets.com offered 3.6 million shares (or 10.6%) of its stock to the public in an IPO at an offering price of $48/share. Through the offering, FreeMarkets.com raised $173 million in capital. However, during the first day of trading, the share price for the stock soared from the IPO price (i.e., $48) to $280. Accordingly, if the company and the IPO underwriter had better anticipated the public demand for the company's stock, the company could have instead raised $1.008 billion. Consequently, the company effectively left $835 million on the table.

In view of the market demand for their stock, companies who have left a great amount of money on the table may launch a secondary offering to raise additional capital. A secondary offering, however, is not an initial offering in which a market for the stock is created. Rather, the share price for a secondary offering is contingent upon prior trading, and cannot be established by other pricing models such as the Dutch auction method. In addition, the secondary offering may dilute the value of the initially offered stock, thus decreasing the value of the stock held by company shareholders who acquired shares during the initial offering. Moreover, federal security regulations require a company to prepare a second offering memorandum before the secondary offering, thereby causing the company to incur additional expenses, such as the legal fees associated with the preparation of the second offering memorandum, before it can realize the additional capital from the secondary offering.

To minimize the amount of money left on the table, alternative IPO models have been proposed. One such alternative model is an electronic "Dutch auction method", such as available at www.openipo.com (Open IPO is a registered trademark of W.R. Hambrecht & Co., LLC, San Francisco, Calif.). According to the Dutch auction method, investors who wish to buy stock in an IPO can simply submit to a subscribing underwriter of the offering a secret, on-line bid for the number of shares they desire. The bids may be above or below a price set by the underwriter. The offering company then sells its stock at the lowest bidding price that will enable the company to sell all of the shares it is offering. As a result, all the winning bidders ultimately pay the same price, which for some bidders may be lower than their bidding price.

Thus, the Dutch auction model allows an offering company to reduce the amount of money left on the table because the selling price of the initial shares is more reflective of the market demand of the stock. However, even with the Dutch auction model, a company launching an IPO can still leave significant amounts of money on the table because all of the offered shares are sold at the lowest bidding price which enables the company to sell all of the shares it is offering.

Accordingly, there exists a need for a method by which privately-held companies can raise capital commensurate with the fair market value of their stock through an initial public stock offering.

BRIEF SUMMARY OF INVENTION

The present invention is directed to a method for offering stock. According to one embodiment, the method includes offering a first portion of shares of the stock at a first price, and offering a second portion of the shares at a second price after a first trading interval of a first predetermined time period after the offering of the first portion of the shares.

According to another embodiment, the present invention is directed to a method for offering stock including auctioning shares of the stock to be publicly offered to at least one potential subscriber, and awarding an allotment of the shares to the potential subscriber based on the auctioning. The method may also include the potential subscriber offering the allotment of the shares to public investors.

According to another embodiment, the present invention is directed to a method for offering stock including auctioning shares of the stock to be publicly offered to at least one potential subscriber, awarding an allotment of the shares to the potential subscriber at a first share price dependent upon a bid price of the potential subscriber during the auctioning for a quantity of the shares, offering a first portion of the allotment of the shares by the potential subscriber at the first share price, and offering a second portion of the allotment of the shares by the potential subscriber at a second share price after a first trading interval of a first predetermined time period after the offering of the first portion of the shares.

The stock offering methods of the present invention represent an advancement over prior IPO models because they reduce the amount of money left on the table by the offering company and, therefore, augment the proceeds available to the treasury of the company from the offering. Further, the methods of the present invention may reduce market volatility for initially offered stock. These and other benefits of the invention will be apparent from the detailed description of the invention hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

Figure 1:
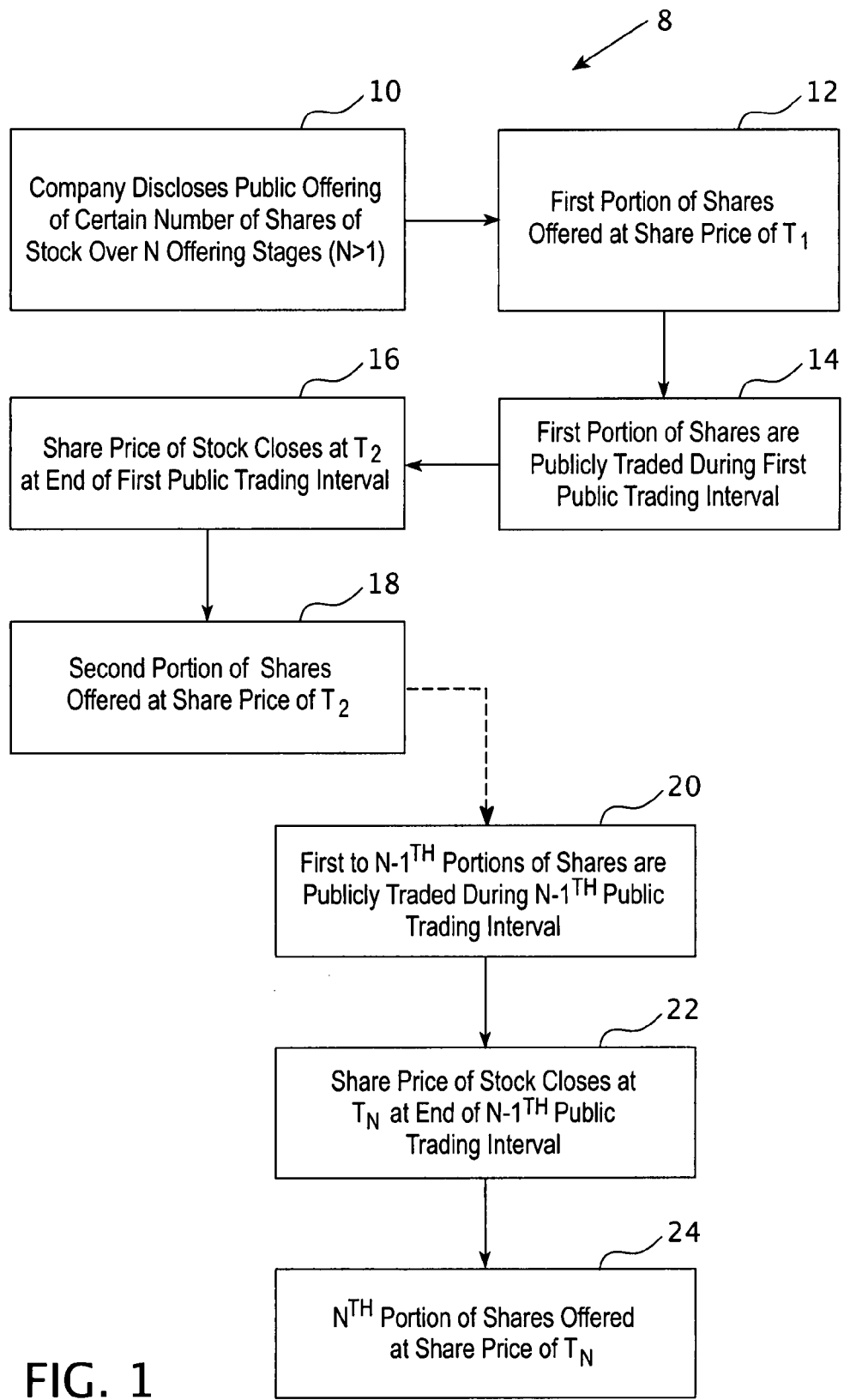
FIG. 1 is a block diagram of a public stock offering method according to one embodiment of the present invention.

FIG. 1 is a block diagram illustrating a public stock offering method 8 according to one embodiment of the present invention. The method 8 begins at block 10 with the company disclosing a public offering of a certain number of shares of stock in the company to the public through a plurality (N) of serially staged offerings, wherein each staged offering is separated by at least one public trading interval. The disclosure may include offering particulars such as, for example, the total number of shares to be offered, the number of stages of the offering, the length of the public trading intervals between offering stages, the number of shares to be offered at each stage, and how the share price for subsequent stages of the offering is to be determined.

After announcing the parameters of the public offering, the process continues to block 12 where a first portion of the total number shares to be offered are offered to the public during the first stage at a first price ($T_1$). The process continues to block 14, where the first portion of the shares are traded during the first public trading interval on an open market by public investors. During the public trading interval, the first portion of shares may be traded according to any public trading means, including conventional brokerage transactions and on-line trading. At block 16, trading on the first portion of the shares closes with the shares at a second share price ($T_2$). From block 16, the process continues to block 18, where a second portion of the shares to be offered are publicly offered at the second stage at the second share price ($T_2$).

The steps of the method 8 illustrated in FIG. 1 may be repeated until the total number of shares to be offered by the company during the offering are completely offered to the public. For example, from block 18, the process may continue to block 20, where the first to $N-1^{TH}$ portions of the shares are publicly traded during the $N-1^{TH}$ public trading interval. At block 22, trading of the first to $N-1^{TH}$ portions of the shares during the $N-1^{TH}$ public trading interval may end with the shares at a closing price of $T_N$. Then, at block 24, the final portion (the $N^{TH}$ portion) of the shares may be offered to the public at the final stage (the $N^{th}$ stage) of the offering at a share price of $T_N$.

In the above-described embodiment, the number of stages (N) of the offering over which the shares are made available for public trading is greater than or equal to two, and may be separated by a trading interval of a time period of any length which can be handled by the market. For example, the length in time of the public trading intervals between stages of the offering may be on the order of hours, days, weeks, etc. Moreover, where the number of stages of the offering is greater than or equal to three ($N \geq 3$), the length of time of the public trading intervals between the stages may be the same. Alternatively, the length of some or all of the public trading intervals could be unequal. For example, where N=3, the first and second stages of the offering could be separated by a public trading interval of one day, and the second and third stages of the offering could be separated by a public trading interval of two days.

In addition, for the method 8 of the present invention illustrated in FIG. 1, an equal portion of shares may be offered at each stage of the offering. For example, if the company discloses an offering of X number of shares over N stages, then X/N shares may be offered to the public at each of the stages of the offering. According to another embodiment, the portion of shares offered at each of the N stages may be different. For example, if N=3, then X/2 shares may be offered at the first stage, X/4 shares at the second stage, and X/4 shares at the third stage. In any event, the sum of the portions of the shares offered at each of the N stages of the offering equals the total number of shares to be offered during the offering. That is, $$\sum_{n=1}^{N} S_n = X \qquad (1)$$

where N is the number of stages of the offering, $S_n$ is the number of shares offered at each stage, and X is the total number of shares to be offered.

For the public stock offering method 8 of the present invention, the shares may be offered to public investors by subscribers at each offering stage according to, for example, the traditional IPO model or the electronic Dutch auction model. That is, subscribing underwriters may offer the portions of shares at one or more of the stages to large individual or institutional investors as in the traditional IPO model, or the subscribing underwriters may offer the portions of shares at one or more of the stages according to the electronic Dutch auction model. In addition, according to another embodiment, the shares may be offered to public investors by the offering company via a direct public offering (DPO). Such a DPO may be realized, for example, by on-line offering of the shares directly from the offering company to the public investors via a computer network, as described hereinbelow. According to another embodiment, the shares may be offered to public investors at some or all of the offering stages by any combination of these methods.

The method 8 of the present invention provides an advantage over the traditional IPO method and the Dutch auction method because it reduces the amount of money left on the table for the offering company. This is because for the method 8 illustrated in FIG. 1, the offering company is effectively able to adjust the IPO price of the shares to reflect the market demand for the stock at different times during the course of the offering. Furthermore, public investors may be fully disclosed as to the parameters of the offering, such as to the details regarding the total number of shares to be offered, the number of stages, the length of the public trading intervals between offering stages, the number of shares to be offered at each stage, and how the share price for subsequent stages of the offering is to be determined. Thus, the method 8 illustrated in FIG. 1 is not subject to the diluting effect of a secondary offering because the disclosure of the offering particulars to potential investors prior to the first offering stage.

Figure 2:
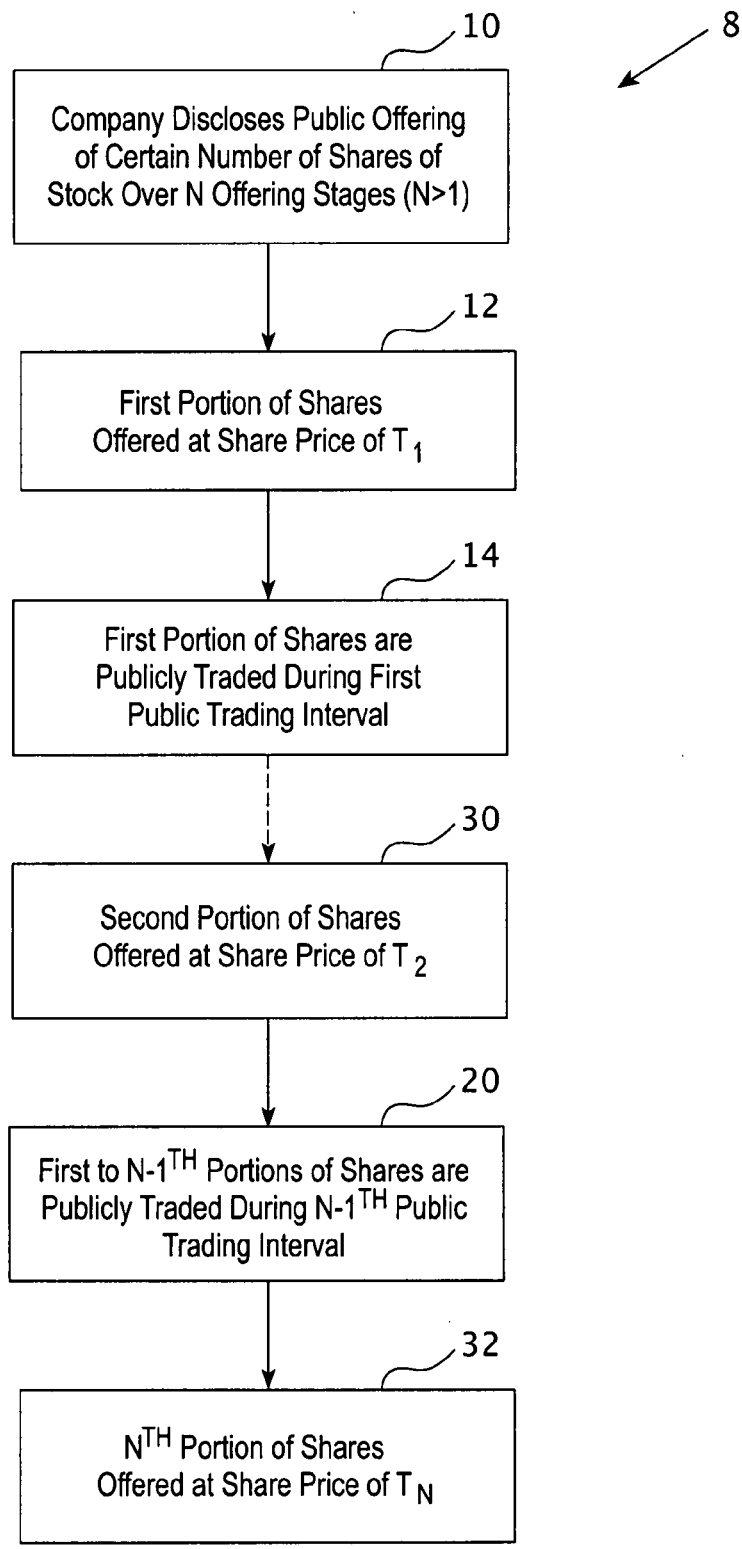
FIG. 2 is block diagram of the method of the present invention according to another embodiment thereof.

FIG. 2 is a diagram of the method 8 of the present invention according to another embodiment. The method 8 illustrated in FIG. 2 is similar to that illustrated in FIG. 1, except that from block 14, the process continues to block 30, where the second portion of the shares are offered at the second stage at a share price of $T_2$, which is not the closing price that the first portion of shares after the first trading interval. Rather, the second share price $T_2$ may be a predetermined price such as, for example, a share price established according to, for example, traditional IPO pricing techniques. In addition, according to another embodiment, the second share price $T_2$ may be determined based on the closing price of the first portion of shares during the first trading interval. For example, the second share price $T_2$ may be 5% more than the closing price of the first portion of shares during the first trading interval.

In addition, for the method 8 illustrated in FIG. 2, where the number of stages of the offering is greater than two (i.e., $N \geq 3$), the process may continue until all of the shares to be offered to the public are distributed over the N stages. For example, from block 30 the process may continue to block 20, where the first to $N-1^{TH}$ portions of the shares are traded during the $N-1^{TH}$ public trading interval. Then, from block 20 the process may continue to block 32, where the $N^{TH}$ portion of the shares are offered at the $N^{TH}$ stage at a share price of $T_N$, wherein the share price $T_N$ is not the closing price of the first to $N-1^{TH}$ portions at the end of the $N-1^{TH}$ trading interval.

According to another embodiment of the method 8 illustrated in FIG. 2 where $N \geq 3$ although the share price $T_2$ for the second stage of the offering may be different than the closing price of the first portion of shares during the first trading interval, the share price for a subsequent stage of the offering may be determined by the closing price of the share portions traded during the previous public trading interval. According to another embodiment of the present invention where $N \geq 3$, the share price $T_2$ for the second stage offering may be the closing share price of the first portion of shares traded during the first public trading interval, and the share price of a subsequent stage of the offering may be different from the closing price of the portions of shares trading during the previous public trading interval. According to other embodiments of the present invention, subsequent share prices may be established according to a combination of, for example, both the closing share price during the previous public trading interval and a predetermined share price, such as a share price determined by an underwriter according to conventional IPO pricing techniques.

The stock offering method 8 illustrated in FIGS. 1 and 2 may be facilitated by, for example, communications between the offerer of the shares and the public investors via a computer network such as, for example, the Internet or an intranet. For example, some of all of the first to $N^{TH}$ portions of the shares may be offered from an interface document such as, for example, an HTML or XML web page, hosted by a server. The server may be maintained by the offerer of the shares, which may be, for example, an underwriter for the traditional IPO method and the Dutch auction method, or the offering company for a DPO. The server may be in communication with end user terminals of the public investors, such as personal computers, laptop computers, and personal digital assistants, via, for example, TCP/IP communications links. The public investors may purchase shares by submitting purchase requests to the server via the TCP/IP communications links. The server may compile the purchase requests and execute the offering according to operating instructions stored by the server or a device in communication with the server.

The present invention is also directed to a method of subscribing to shares of stock to be publicly offered. Traditionally, as explained hereinbefore, underwriters subscribe to a public stock offering and then establish the IPO price. Alternatively, in some instances, the IPO price may be effectively established according to the Dutch auction model, as described hereinbefore. In either case, the amount of capital available to the company launching the IPO is limited to the offered shares at their IPO price (less an underwriter discount). According to an embodiment of the present invention, the company launching the IPO auctions the shares to be made public during the offering to potential subscribers. Therefore, rather than having the subscribers (i.e., underwriters) establish an IPO price according to traditional models, the IPO price can be established by an auction among potential subscribers.

The auction among the potential subscribers may be, for example, a conventional auction, wherein the highest bidders are awarded an allotment of the shares until all of the shares to be offered are awarded to at least one of the potential subscribers. According to one embodiment, all of the shares to be publicly offered are awarded to the highest bidder among the potential subscribers. According to another embodiment, a number of potential subscribers are awarded allotments of the shares to be publicly offered, provided that all of the shares to be publicly offered are awarded. For example, assume the company launching the IPO intends to offer 1,000,000 shares to the public, and potential subscribers bid for quantities of the shares to be offered as follows:

TABLE 1

| Bidder | Quantity Requested | Bid Price (per share) |
|---|---|---|
| 1 | 300,000 | $15 |
| 2 | 300,000 | 14 |
| 3 | 300,000 | 13 |
| 4 | 300,000 | 12 |
| 5 | 300,000 | 12 |
| 6 | 300,000 | 10 |

Then, according to such a scenario, Bidder 1 may be awarded an allotment of 300,000 shares at $15/share, Bidder 2 may be awarded an allotment of 300,000 shares at $14/share, Bidder 3 may be awarded an allotment of 300,000 shares at $13/share, and Bidders 4 and 5 may be awarded an equal allotment of the remaining 100,000 shares at $12/ share. The winning subscribers may then offer the shares to the public according to, for example, the traditional IPO method, wherein the subscribers sell the shares to large individual and institutional investors, who then offer the shares publicly. According to another embodiment, the subscribers may offer their shares to the public according to the Dutch auction model, such as the electronic Dutch auction model available at www.openipo.com.

According to another embodiment, the allotments of the shares may be awarded among the winning bidders at the lowest winning bid price for which all the shares to be offered to the public are subscribed to. For example, for the scenario outlined in TABLE 1 hereinbefore, because $12/share is the lowest bid at which all 1,000,000 of the shares to be offered are subscribed to, Bidders 1, 2, and 3 may each be awarded an allotment of 300,000 shares at $12/share, and Bidders 4 and 5 may be awarded an equal allotment of the remaining 100,000 shares at $12/share. Again, as described hereinbefore, the winning subscribers may then offer the shares to the public according to, for example, the traditional IPO model or the Dutch auction model.

The stock offering method 8 described hereinbefore with reference to TABLE 1 may be facilitated by, for example, communications between the offerer of the shares and the bidders via a computer network such as, for example, the Internet or an intranet. For example, the bidding of the shares may be conducted from an interface document such as, for example, an HTML or XML web page, hosted by a server. The server may be maintained by the offerer of the shares. The server may be in communication with end user terminals of the bidders such as, for examples, personal computers, laptop computers, and personal digital assistants, via, for example, TCP/IP communications links. The bidders may place bids for a quantity of the shares by submitting their bids to the server via the TCP/IP communications links. The server may compile the bids and execute the auction according to operating instructions stored by the server or a device in communication with the server.

Figure 3:
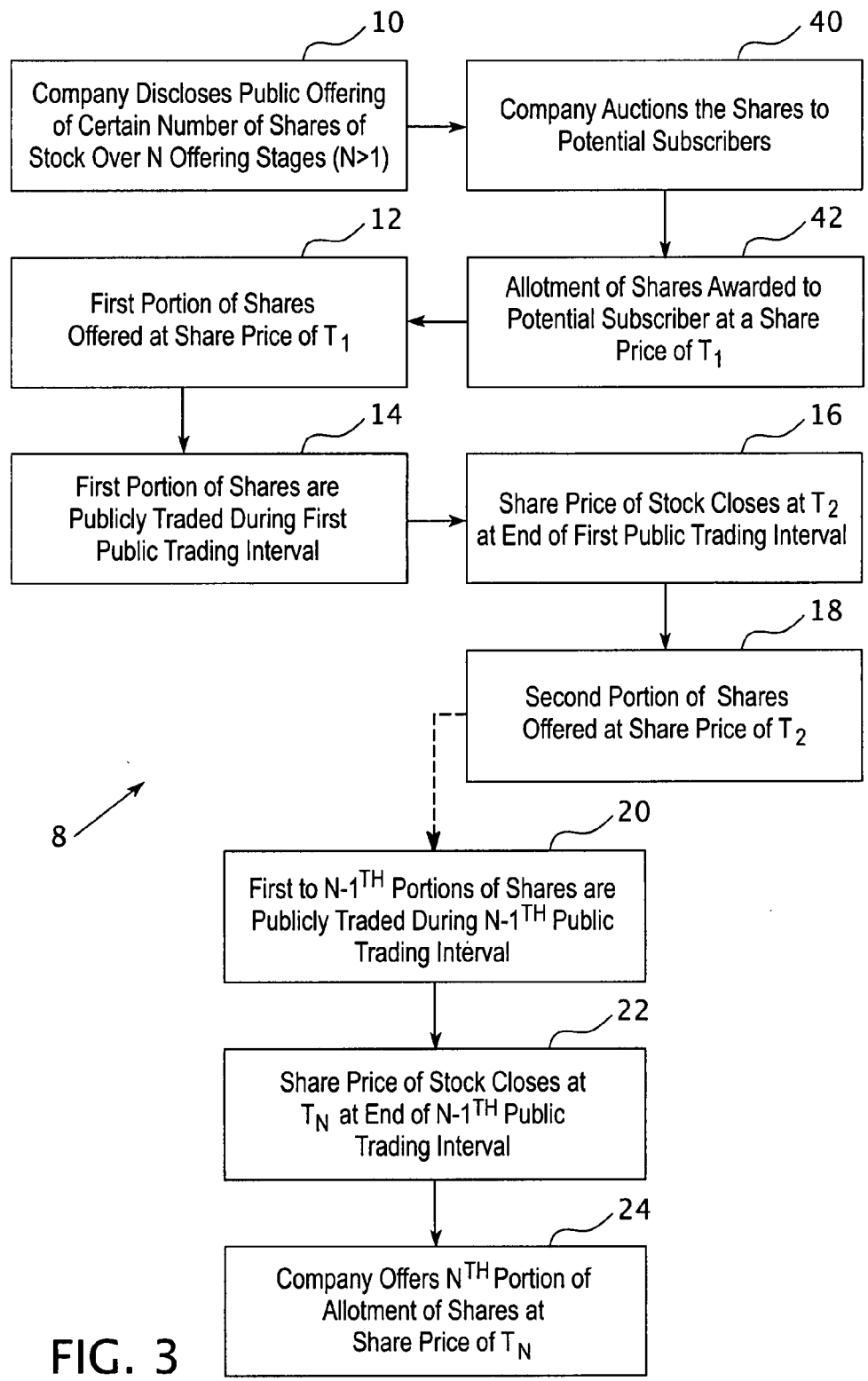
FIG. 3 is block diagram of the method of the present invention according to another embodiment thereof.

According to another embodiment of the present invention, the company launching the IPO may auction the shares to be offered to the public to subscribers as discussed hereinbefore, and then the subscribed-to shares may be offered to the public according to the serially staged offering method described hereinbefore with respect to FIGS. 1 and 2. FIG. 3 is a block diagram of the method 8 according to such an embodiment. The method 8 begins at block 10, with the company launching the IPO disclosing the number of shares to be offered and the number of offering stages. As discussed hereinbefore, the disclosure may include the total number of shares to be offered, the number of stages, the length of the public trading intervals between offering stages, the number of shares to be offered at each stage, and how the share price for subsequent stages of the offering is to be determined. From block 10, the process continues to block 40, where the offering company auctions the shares to potential subscribers. As a result of the auction, at block 42, a winning subscriber is awarded an allotment of the shares at a share price of $T_1$. According to one embodiment, the allotment may include all of the shares to be publicly offered, such that there is only one subscriber to the offering. According to another embodiment, the allotment may include a fraction of the total number of shares to be offered, such that a number of potential subscribers may be awarded allotments of the shares. In addition, the price ($T_1$) may be the winning bid price from the auction and may be determined, for example, according to the subscription auction methods described hereinbefore with reference to TABLE 1.

From block 42, the process advances to block 12, where a first portion of the allotment of the shares is offered to the public at the first stage of the offering by a subscriber at a share price of $T_1$. According to one embodiment, although the shares were awarded to the subscriber at the auction bid price of $T_1$, the subscriber may pay a discounted price to the offering company for the subscribed-to shares. From block 12, the process continues as described hereinabove in conjunction with FIG. 1, such that the share price for the portions of the allotment of the shares to be offered at each stage of the offering is determined by the closing price of the previously offered portions during the previous public trading interval. According to another embodiment of the present invention, the share price for the portions of the allotment of the shares at each stage of the offering may not be the closing price of the previously offered portions during the previous public trading interval, but rather may be, for example, a predetermined share price established, for example, by an underwriter according to, for example, conventional IPO pricing techniques. According to another embodiment of the present invention, for example, subsequent share prices may be determined according to a combination of the closing share price during the previous public trading interval and a predetermined share price.

Although the present invention has been described herein with regard to certain embodiments, those of ordinary skill in the art will recognize that many modifications and variations of the present invention may be implemented. For example, the methods of pricing the shares may include, in addition to the conventional underwriting model and the Dutch auction model described hereinbefore, all present and future pricing models. The foregoing description and the following claims are intended to cover all such modifications and variations.

What is claimed is:

1. A method for offering shares of stock of a privately-held company comprising:

disclosing, prior to an initial public offering by the privately-held company, the number of shares to be offered in the initial public offering by the privately-held company, that the initial public offering will occur in two or more successive offering stages, the number of shares to be offered in each offering stage, the amount of time between successive offering stages, and pricing information for the shares to be offered in each offering stage;

offering a first portion of the shares of the stock of the offering in a first offering stage to investors; and offering the remainder of the shares of the offering to investors in separate portions over the subsequent one or more offering stages, wherein at least some communications regarding the offering of the shares over the offering stages are made via a computer network.

2. The method of claim 1, wherein the pricing information includes that the price of the shares offered in at least one of the offering stages is to be determined, at least in part, according to a Dutch auction.

3. The method of claim 1, wherein the pricing information includes that the price of the shares offered in at least one of the offering stages is to be determined, at least in part, according to a direct public offering.

4. The method of claim 1, wherein the pricing information includes that the price of the shares offered in at least one of the offering stages is to be determined, at least in part, according to a traditional IPO pricing.

5. The method of claim 1, wherein the pricing information includes that the price of the shares offered in an offering stage subsequent to the first offering stage is to be calculated based on, at least in part, a trading price for the shares at the close of a prior trading interval.

6. The method of claim 1, wherein the pricing information includes that the price of the shares offered in an offering stage subsequent to the first offering stage will equal a trading price for the shares at the close of a prior trading interval.

7. The method of claim 1, wherein the pricing information includes that the price of the shares offered in an offering stage subsequent to the first offering stage will be calculated based on, at least in part, a percentage of a trading price for the shares at the close of a prior trading interval.

8. The method of claim 1, wherein the pricing information includes that the price of the shares offered in at least one of the offering stages is to be determined according to a combination of at least two of the following pricing models: a Dutch auction, a direct public auction, and traditional IPO pricing.

9. The method of claim 1, wherein the number of shares offered in each offering stage is equal.

10. The method of claim 1, wherein a trading interval between successive offering stages is one hour in duration.

11. The method of claim 1, wherein a trading interval between successive offering stages is one day in duration.

12. The method of claim 1, wherein the time amount between each offering stage has the same duration.

13. The method of claim 1, further comprising, prior to the first offering stage:
auctioning shares of the stock to at least one potential subscriber; and
awarding an allotment of the shares to the at least one potential subscriber at an auction price dependent upon a bid price of the at least one potential subscriber during the auctioning for a quantity of the shares.

* * * * *